(12) United States Patent
McArdle

(10) Patent No.: US 6,395,198 B1
(45) Date of Patent: May 28, 2002

(54) ANTI-CAKING AND ANTI-DUSTING COMPOSITION AND CORRESPONDING METHODS

(76) Inventor: Biaise McArdle, 7102D Sladek Rd., New Hope, PA (US) 18938

( * ) Notice: Subject to any disclaimer, the term of this patent is extended or adjusted under 35 U.S.C. 154(b) by 0 days.

(21) Appl. No.: 09/672,047

(22) Filed: Sep. 29, 2000

Related U.S. Application Data

(60) Provisional application No. 60/157,011, filed on Oct. 1, 1999.

(51) Int. Cl.⁷ .............................. C09K 13/18; A23L 1/00
(52) U.S. Cl. ......................... 252/383; 252/384; 252/385
(58) Field of Search ................................. 252/383, 381, 252/382, 384, 385

(56) References Cited

U.S. PATENT DOCUMENTS

| | | |
|---|---|---|
| 1,904,341 A | 4/1933 | Young |
| 1,974,915 A | 9/1934 | Evanston |
| 3,227,569 A | 1/1966 | Thompson, Jr. |
| 3,346,407 A | 10/1967 | Van Leuven |
| 3,696,621 A | 10/1972 | Simms et al. |
| 3,763,072 A | 10/1973 | Krieger |
| 3,876,576 A | 4/1975 | Michalski |
| 3,900,611 A | 8/1975 | Corbett et al. |
| 3,939,662 A | 2/1976 | Volz |
| 4,007,258 A | 2/1977 | Cohen et al. |
| 4,088,791 A | 5/1978 | Jones |
| 4,178,370 A | 12/1979 | Glabe et al. |
| 4,183,959 A | 1/1980 | Wood et al. |
| 4,330,438 A | 5/1982 | Dierassi et al. |
| 4,376,133 A | 3/1983 | Farnard |
| 4,754,027 A | 6/1988 | Applegren |
| 4,997,671 A | 3/1991 | Spanier |
| 5,021,248 A | 6/1991 | Stark et al. |
| 5,126,143 A | 6/1992 | Nakashima et al. |
| 5,160,742 A | 11/1992 | Mazer et al. |
| 5,182,130 A | 1/1993 | Haralampu et al. |
| 5,294,457 A | 3/1994 | Jenkins et al. |
| 5,356,467 A | 10/1994 | Oshlack et al. |
| 5,395,646 A | 3/1995 | Basseres et al. |
| 5,514,412 A | 5/1996 | McArdle |
| 5,591,473 A | 1/1997 | McArdle |
| 5,626,658 A | 5/1997 | McArdle |
| 5,645,880 A | 7/1997 | McArdle |
| 5,665,414 A | 9/1997 | Sherwood et al. |
| 5,747,416 A | 5/1998 | McArdle |
| 5,766,330 A | 6/1998 | Knights et al. |
| 5,942,123 A | 8/1999 | McArdle |
| 6,126,974 A | 10/2000 | Ang |

OTHER PUBLICATIONS

U.S. application No. 08/820,264 McArdle, filed Mar. 18, 1997.

*Primary Examiner*—Joseph D. Anthony

(57) ABSTRACT

An anticaking and antidusting composition is disclosed that comprises a protein, a saccharide, an alkali metal or alkaline earth metal salt and an acid. The composition is effective in preventing the agglomeration or caking of particulate materials, namely inorganic salts, and can effectively treat such materials utilizing amounts less than 100 ppm by weight of material being treated. Methods of preparing the composition are also disclosed as well as methods for treating a particulate material with the composition.

26 Claims, No Drawings

ANTI-CAKING AND ANTI-DUSTING COMPOSITION AND CORRESPONDING METHODS

CROSS-REFERENCE TO RELATED APPLICATIONS

This application claims priority from U.S. Provisional Patent Application Serial No. 60/157,011 entitled "Anticaking and Antidusting Composition", filed Oct. 1, 1999. The disclosure of this provisional application is incorporated herein by reference in its entirety.

BACKGROUND OF THE INVENTION

1. Field of the Invention

This invention relates to compositions that can be applied onto granules of inorganic salts, particularly granules of sodium chloride, to reduce the tendency to cake on storage and to minimize fugitive dust.

2. Related Prior Art

Many hard crystalline materials, particularly inorganic salts and mineral ores, tend to contain fines or to be friable and form fines, and these fines can be a nuisance. Also, these materials tend to harden and form large, agglomerated masses upon exposure to moisture in humid environments, particularly during long periods of storage. These hardened masses are generally referred to as cakes. Some cake formations become very rigid and resistant to separation, making the material very difficult to transport and to break apart so as to facilitate its use in particular applications. In certain situations where an enormous amount of a material has formed as a solid cake, explosives may be necessary to separate the cake into particulate matter.

It is desirable to provide an anticaking agent, in either solid or liquid form, that will be effective when applied to salts in a small amount to minimize dusting and to reduce the caking tendencies for extended periods of time so that the coarse granular crystalline materials will remain easily movable, despite long term storage, and ready for use by the consumer.

Economization and automation of industrial processes for inorganic salts require the salt to be in a granular form so that it can flow freely during subsequent processing steps. In emptying storage silos containing tons of inorganic salt, for example, there is increased operational expense and potential danger on account of the tendency of the salt to cake. The salt cakes must be disintegrated by a mechanical auxiliary apparatus in order to be emptied or loaded from the silos. Additionally, during commercial use of the salt, any step of dosing or mixing agglomerated or caked salt together with other substances is difficult due to the extent of the caking.

Many attempts have been made to find ways and means to reduce or entirely eliminate the tendency of inorganic salts to harden. One of the best known processes consists of dry mixing with such salts finely divided fillers, such as silica, alkali, alkaline earth and aluminum silicates, aluminum oxide, magnesium oxide, calcium oxide or alkaline earth carbonate. These additives form a loose jacket around the individual salt crystals or granulates that in the recrystallization of the salt prevent a formation of bridges between the individual particles and therefore the potential for caking. The disadvantage of these additives is that they must be used in relatively large amounts in order to produce a suitable anticaking effect. Through the use of large amounts of these additives the products tend to lose most of their clear solubility in water.

Organic additives such as oils, glycerine, paraffins, paraffin oils, alkyl sulfonates or fatty amines, are also effective in the prevention of anticaking in organic salts. However, these additives for the most part are disadvantageous in that they can only be placed on the salt at great industrial expense. For example, a dosing of a hot salt, as it comes out of production, by means of cocofatty amines is practically impossible because of the odor troubles and danger to health associated therewith. The amines cannot be added during the salt production step, but rather must be added in an additional step after the salt cools. In the interim storage of the salt there is no protection against the possibility of caking.

It has long been known that the hardening of alkali chlorides can be reduced by an addition of complex ferrocyanides. These products are expensive and are typically utilized in large amounts based upon the total amount of alkali chloride product being treated. Additionally, the use of ferrocyanides is of some concern due to its potential toxic effect to the environment, e.g. in road salt applications where run-off of treated road salts may wind up in lakes and streams.

It is the object of the present invention to provide an effective anticaking and antidusting agent for inorganic salts that is environmentally safe and contains only metals such as alkali metal or alkaline earth metals.

It is a further object of the present invention to provide an anticaking and antidusting agent that is highly effective when added in relatively low dosage amounts to inorganic salts in either a powder form or a liquid spray form.

It is yet another object of the invention to provide a modified inorganic salt product containing the anticaking and antidusting agent that is resistant to caking when exposed to high humidity and other moisture conditions.

SUMMARY OF THE INVENTION

The aforementioned objects are accomplished by providing an agglomeration preventing or anticaking agent for inorganic salts, as well as a process for the production of such agent, wherein the agent comprises a protein, a saccharide, an alkali metal or alkaline earth metal salt and an acid. The anticaking agent of the invention is especially suited for the prevention of caking together and for preserving the flowability of salts, specifically alkali chlorides, e.g. sodium chloride or potassium chloride, and alkali chloride containing salt mixtures. The protein in the agent is preferably a prolamine, most preferably zein. The saccharide is preferably a polysaccharide, most preferably a guar gum. The salt is preferably sodium chloride, most preferably sodium chloride with trace amounts of magnesium chloride and calcium chloride. The acid in the agent is preferably an organic acid, and most preferably at least one of citric acid and ascorbic acid. In a most preferred embodiment of the invention, the anticaking agent composition comprises predominantly guar gum with small amounts of the prolamine, salt and acid.

The present invention also relates to a method of making the anticaking agent, comprising mixing a protein, a saccharide and a salt in an aqueous organic solvent that contains an acid until a complex is formed. The resultant complex is then separated from the solvent and dried so as to form the anticaking agent of the invention.

The present invention further relates to methods for applying an effective amount of the anticaking agent to an inorganic salt to prevent the modified salt mixture from caking, wherein the application of the anticaking agent to the inorganic salt can be in a solid or liquid form. A modified salt product that contains an effective mixture of the anticaking agent is also encompassed by the invention.

DESCRIPTION OF THE PREFERRED EMBODIMENTS

In accordance with the present invention, an agglomeration preventing or anticaking agent comprises a complex of a protein, a saccharide, preferably a polysaccharide, an alkali metal or alkaline earth metal salt and an acid, preferably an organic acid. The components of the complex are preferably not toxic and are environmentally friendly, unlike some of the other commercially available anticaking agents (e.g. ferrocyanide compositions).

The anticaking agents are also useful in the prevention of dust formation in normally dusty solid materials, namely particulate organic and inorganic material such as wheat, coal fines and the like. It is noted that the agent compositions disclosed in the invention for use as anticaking agents may be applied in the same manner and proportions to various materials to prevent the formation of dust at the surface of those materials.

The anticaking agent compositions of this invention may be employed by spraying the agent in liquid form onto coarse granules of salts, particularly sodium chloride or dietetic salt. The typical coarse granules are usually in the range of 1 to 5 millimeters in diameter, usually from 2 to 3 millimeters. The anticaking agents may also be employed by dry blending the agent in powder form into the salt compositions or dissolution into a salt brine prior followed by crystallization of the modified salt from solution.

Protein and polysaccharide components utilized in the present invention include a water-soluble monosaccharide or polysaccharide and a substantially water-insoluble protein. Those two components form a complex together when mixed either in granular form or in solution. Mixing those two components in an organic solvent together with the salt and acid utilized in the invention forms a unique complex in solution that is useful as an anticaking agent.

Proteins useful in formulating the anti-caking agents include any protein that is predominately or substantially water-insoluble. Vegetable proteins or prolamines are particularly preferable due to their availability and low cost. Prolamines are cereal-derived proteins that are insoluble in water, absolute alcohol or neutral solvents and soluble in dilute (80%) alcohol. Examples of suitable prolamines for use in the present invention include, but are not limited to, corn-derived prolamine or zein, barley-derived prolamine or hordein, wheat-derived prolamine or gliadin, millet and combinatons thereof. In a preferred embodiment of the invention, the vegetable protein or prolamine used in the composition is zein or corn gluten. Corn gluten is obtained from corn or maize. The zein may be physically extracted from the corn gluten or, alternatively, the entire corn gluten may be provided as a mashed paste or powder.

Examples of monosaccharides and polysaccharides that can be used to prepare the anticaking agents include, but are not limited to fructose, glucose, lactose, maltose, sucrose, water-soluble cellulose derivatives, seaweed polysaccharides such as alginate and carrageenin, seed mucilaginous polysaccharides, complex plant exudate polysaccharides such as gum Arabic, tragacanth, guar gum, pectin, ghatti and the like, and microbially synthesized polysaccharides such as xanthan gum. In a preferred embodiment, the polysaccharides are guar gum, pectin, gum Arabic and combinatons thereof. The most preferred polysaccharide for use in the present composition is guar gum, which has been found to be effective in binding and stabilizing the components of the agent.

The salts utilized in making the anticaking compositions of the invention include alkali and alkaline earth metal salts. Such salts may include chlorides, carbonates, sulphates, silicates and combinatons thereof. Particularly useful salts are sodium, magnesium and/or calcium salts, preferably sodium chloride, magnesium chloride and calcium chloride. In a most preferred embodiment, calcium chloride and magnesium chloride are provided in trace amounts within sodium chloride, wherein the weight ratio between the two is about 3:1 of calcium chloride to magnesium chloride. A typical sodium chloride salt utilized in making the anticaking agent of the invention includes about 0.06% by weight of calcium chloride and 0.02% by weight of magnesium chloride.

Any acidic compound is useful in the present invention, including inorganic acids such as carbonic acid, sulfuric acid, hydrochloric acid and the like. However, it is preferable to utilize organic acids, preferably $C_1$ to $C_{20}$ organic acids. Suitable organic acids include, but are not limited to, citric acid, malic acid, adipic acid, tannic acid, lactic acid, ascorbic acid, acetic acid, fumaric acid and the like as well as combinatons thereof In a preferred embodiment, citric acid or a combination of citric acid and ascorbic acid is utilized.

The anticaking agent is generally prepared by mixing all of the components in an aqueous organic solvent system. A complex comprising the protein, saccharide, salt and acid forms within the upon addition and adequate mixing of the components to the solvent system. Although a complex will form based upon the addition of components in any order, it is preferable to add the acid to the solvent before the protein during the preparation of the anticaking agent of the invention. The acid facilitates adequate dispersion of the protein in the solvent to ensure adequate mixing of the agent components and formation of a complex in solution. In a generally preferred method for preparing the agent, a sufficient amount of soluble monosaccharide or polysaccharide is first dissolved in an aqueous organic solvent system. A sufficient amount of acid and an alkali or alkaline earth metal salt are then added to the solution, followed by the addition of a sufficient amount of water-insoluble protein or prolamine. Upon addition of the protein and adequate mixing, a complex forms within the solution. If desired, the solvent is then separated or evaporated from the solution to yield the final anticaking agent.

The aqueous organic solvent system is a mixture containing at least one organic solvent in water. Suitable organic solvents include, but are not limited to, alcohols such as ethyl alcohol and isopropyl alcohol, glycols such as propylene glycol and polyethylene glycols, and, ketones such as acetone. In a preferred embodiment of the invention, the aqueous organic solvent system is either aqueous ethyl alcohol or aqueous isopropyl alcohol. Alcohols generally are preferred because they can hold up to six grams of the prolamine in solution for each 100 milliliters of alcohol. The desired ratio of water to organic solvent in the aqueous organic solvent system is dependent on factors such as the miscibility of the solvent in the water and the amount of protein to be dissolved. When the organic solvent system is aqueous ethyl alcohol or aqueous isopropyl alcohol, the amount of water generally ranges between about 10% to 40% by weight and the amount of alcohol generally ranges between about 60% to 90% by weight. Preferably, the amount of water in such systems is between about 25% to 35% and the amount of alcohol is between about 65% to 75%.

The preferred final composition by weight of the dried anticaking agent is as follows: between about 0.00164–99.997% of protein, preferably zein; between about 0.001–99.87% of saccharide, preferably guar gum; between about 0.001–99.5% of salt, preferably sodium chloride; and between about 0.001–10% of acid, preferably citric acid or citric acid combined with ascorbic acid. An anticaking agent will be effective in the prevention of cake formation in salts utilizing any of the previously disclosed weight ratios for each component. However, a preferred embodiment determined as being highly effective as an anticaking agent has a composition consisting of about 0.1–5% by weight of zein, about 90–96% by weight of guar gum, about 1–3% by weight of sodium chloride and about 0.5–3% by weight of citric acid or citric acid combined with ascorbic acid. Most preferably, the composition of each component by weight is as follows: about 0.5% zein, about 95.4% guar gum, about 2% sodium chloride and about 2.1% citric acid.

The monosaccharide or polysaccharide, protein or prolamine, alkali or alkaline earth metal salt and acid are added to the aqueous organic solvent system in appropriate amounts based upon the desired final composition of the agent. Since essentially the entire amount of each component added to the solvent forms a part of the complex in solvent, the amount of each component to add to the solvent can be easily determined based upon the desired final composition. A complex will thus form in the solvent based upon components being added in any amount necessary to yield a final composition falling within the previously disclosed weight percentage ranges. Typically, the total amount of components added to a solvent is less than or equal to about 500 grams per liter of solvent.

The dissolution of components in the solvent is carried out at a temperature between about 20° C. (ambient room temperature) and about 60° C., preferably about 30° C., using conventional agitation methods to form the slurry solution. Mixing of the components in solution is carried out until a complete uniform mixture is attained. Typically, a mixing period of at least 10–30 minutes is required. Preferably, the components are mixed for several hours to ensure complete formation of the complex. The components in solution are mixed by conventional agitation methods including, but not limited to, manual shaking, mechanical shaking, magnetic stirring, mechanical stirring or a combination thereof. Such mixing results in the formation of the anticaking complex within the solvent.

Once the anticaking complex in solution has been prepared, the solvent may be separated or evaporated so as to yield a dry composition. Any number of conventional solvent removal techniques may be used including, but not limited to, vacuum drying, centrifugation, evaporation, freeze drying, air drying, convection oven drying or a combination thereof. The complex is typically dried to a moisture content of no more than about 0.1%. The anticaking composition can be further processed by grinding or milling to a desired mesh particle size for use as a powder and the like.

The application of the anticaking composition of the invention to an inorganic salt can be accomplished in a variety of ways including, but not limited to, dry mixing the composition with the salt, admixing the composition with a solution such as water and spraying onto the salt, and dissolution of the composition in a brine solution followed by recrystallization of the salt within the brine. In one embodiment, the composition of the present invention may be sprayed onto granular salts while these granules are in motion, e.g., while they are being tumbled or conveyed. The manner of spray application is itself well known and a matter of common knowledge in the field.

In prior art methods for preventing caking of inorganic salts with compositions such as ferrocyanides or aluminum silicon dioxides, typically amounts of 100 ppm or more of the composition in the salt were required to ensure adequate anticaking properties. The anticaking agent of the invention is added to a particular salt in an effective amount to prevent caking of the salt when exposed to moisture. The term "effective amount" is defined as any amount of the agent that is effective in preventing caking of a salt treated with such agent. Although such effective amount can be greater than 100 ppm, it has been determined that the agent is equally as effective when utilizing amounts much less than 100 ppm. In fact, it is preferable in most applications to apply the anticaking agent to a salt in amounts of about 3–5 ppm or less, and best results are obtained when the agent is applied in that dosage range. This represents an economical treatment that is highly effective and which introduces a minimal adulteration to the treated salt product.

Upon adequate application of the anticaking composition of the invention to an inorganic salt in an effective amount, the resultant salt product is modified such that it resists caking in environments in which the salt is exposed to moisture. It is believed that the modified salt product is a result of a new crystal formation in the salt resulting from the addition of the anticaking composition of the invention.

The following examples show specific methods of making anticaking agents of the invention, methods of applying those anticaking agents to inorganic salts, and test results showing the performance of the resultant modified salts when exposed to moisture for a substantial period of time. Although the compositions of anticaking agents in some of the examples vary considerably, each of those anticaking agents was found to be effective in preventing the caking of an inorganic salt after application of a sufficient amount of such agent to such salt.

EXAMPLE 1

One hundred ml of a 70/30-isopropyl alcohol (IPA)/water mixture was mixed in a gravity flask containing a mixing stirrer at a temperature of 250° C. The alcohol water solution was mixed with 0.1 gram of citric acid and 0.1 gram of 100-screen guar gum (from Precem Pvt. Ltd., Bomba, Maharashtra) and stirred for five minutes. To this solution 10 grams of sodium chloride (containing 0.06% by weight of $CaCl_2$ and 0.02% by weight of $MgCl_2$) was added and blended for ten minutes at 100 rpm. Subsequently, 1.0 gram of 60% corn gluten was added and blended at 100 rpm for 2 hours and allowed to stand overnight. At the end of 24 hours the flask was opened at the bottom to separate the liquid and the precipitated material from the resulting mixture.

The liquor was then dried in an oven for 24 hours at 500° C., removed, and ground into a 100-screen powder. Seven grams of this powder was mixed with one metric ton of mined NaCl chemical salt and was found to contribute anticaking and antidusting properties that lasted for several months.

EXAMPLE 2

Example 1 is repeated with the following modifications: the IPA/water solvent was increased to two hundred ml, and 0.2 gram of citric acid was added to 0.2 gram of guar gum. The gluten charge was increased to 26 grams and the NaCl charge was doubled to 20 grams. A similar anticaking result was obtained when added to one metric ton of NaCl.

EXAMPLE 3

Example 1 is repeated with the following modifications: 0.4 gram the citric acid was added to 0.4 gram of guar gum.

The gluten charge was increased to 52 grams and the NaCl charge was doubled to 40 grams. A similar anticaking result was obtained when added to one metric ton of NaCl.

EXAMPLE 4

One hundred grams of 60% corn gluten were placed in a 1000 ml plastic beaker to which 0.1 gram of 100 screen guar gum (Precem Pvt. Ltd., Bomba, Maharashtra) was added and mixed by hand for ten minutes thereby dispersing the guar gum with the gluten. The contents of the beaker were then sprayed with ten grams of a 70/30-isopropyl alcohol/water solution. The contents of the beaker were then again hand mixed for one minute and set aside for one hour at 250° C.

A solution of 100 ml of a 0.05% sodium hydroxide containing one gram of sodium chloride (containing 0.06% by weight of $CaCl_2$ and 0.02% by weight of $MgCl_2$) was prepared and 1.2 grams of the treated gluten were then added to the solution and stirred for twenty-four hours at 100 rpm. The pH of the solution was monitored and an additional 5 grams of the 0.05% solution was added to the mixer at two-hour intervals to maintain a pH of 12. At the end of 24 hours the solution was filtered to remove the extraneous material. One hundred ml of the solution was then poured into a five hundred ml glass beaker. To the solution 50 grams of sodium chloride was gradually added resulting in a stiff paste. Ten grams of the paste was mixed with 0.1 gram of citric acid dissolved in two grams of water in a glass beaker. The resulting mixture was dried in an oven for 24 hours and ground into a 100 screen white powder.

The powder was then tumble mixed with 100 kg of course chemical grade NaCl salt and evaluated for anticaking properties under various moisture conditions. In all cases after three months of evaluation the modified salt product showed effective resistance to caking.

EXAMPLE 5

An alcohol solution consisting of 700 ml pure IPA and 300 ml de-ionized water was prepared in a 2 L glass vessel. The vessel was placed on a heated surface maintained at a constant temperature of 30° C. and the vessel contents blended with a blender at a rate of 300 rpm.

To the alcohol solvent was added 3 grams of citric acid. After blending the contents for an additional five minutes, 2.4 grams of powdered zein was added. The mixture was continuously blended until the zein had completely dissolved (about twenty minutes), forming a slurry in the vessel.

After complete dissolution of the zein in the solvent, the vessel was removed from the blender and 477 grams of guar gum (Precem Pvt. Ltd., Bomba, Maharashtra) were hand mixed into the solution for ten minutes. Then another 7.6 grams of fine crystal citric acid and 10 grams of fine flaked NaCl were added to the mixture and hand blended. The resultant mixture was allowed to stand and then hand mixed several times over a 24 hour period to assure uniform blending of all of the components.

After 24 hours, the material was spread out into flat pans and allowed to dry for 48 hours at about 50° C. The resultant dried material was then ground to a screen size of 200 and stored in a plastic container.

EXAMPLE 6

One liter of 70/30 IPA/water mixture was prepared in a glass beaker. The beaker contents were stirred in a mixer at 200 rpm and heated to a temperature of 30° C. To this mixture was added 1 gram of NaCl, 3 grams of citric acid, and 2 grams of ascorbic acid. After ten minutes of stirring, 25 grams of zein were added and the contents blended for an additional twenty minutes. The solution was then removed from the mixer and allowed to stand for four hours.

After four hours, 225 grams of guar gum (Precem Pvt. Ltd., Bomba, Maharashtra) were blended into solution by hand. To this slurry 9 grams of additional NaCl and 255 grams of citric acid were blended. The resulting composition was then placed onto glass trays and dried in an oven at 40° C. for 48 hours. At the end of 48 hours, the composition was removed from the glass trays and ground to a consistent size and passed through a 300 screen sieve to form a soft white powder. The powder was stored in a plastic container prior to treating an inorganic salt.

EXAMPLE 7

One metric ton of clean salt was tumbled with 5 grams of the anticaking composition of Example 5 for five minutes and then dissolved in a brine circuit by live steam in a direct contact heater. The resultant hot slurry was then flash cooled in an evaporator. Upon cooling, the solubility of the slurry was decreased, resulting in crystallization of the salt incorporated with the anticaking composition. The treated salt crystals were then dried to a moisture content of less than about 0.1%. The resultant modified salt product was determined as having effective anticaking properties when exposed to varying moisture levels for months.

EXAMPLE 8

Five 5-ton stacks of road grade rock salt were prepared and held in an open field covered by a heavy duty clear plastic sheet. These stacks were exposed to normal seasonal conditions in environments including snow and rain for a period of one year. No attempt was made to protect the salt samples other than covering the salt and protecting it against direct contact with snow or rain. The five stacks consisted of the following:

Stack 1: chemical rock salt containing no additives.

Stack 2: chemical rock salt that was spray treated with 5 L of water containing 500 g of a sodium ferrocyanide composition manufactured by Degussa Corporation, Ridgefield Park, N.J.

Stack 3: chemical rock salt that was spray treated with 5 L of water containing 25 g of citric acid and 500 g of the same sodium ferrocyanide utilized in Stack 2.

Stack 4: chemical rock salt that was spray treated with 5 L of water containing 25 g of the anticaking composition of Example 5.

Stack 5: chemical rock salt that was spray treated with 5 L of water containing 25 g of the anticaking composition of Example 5 and 25 g of citric acid.

After one year of field exposure to the elements, the plastic covers were removed on all of the stacks and the salt in each stack was evaluated for testing. Stack 1 showed severe caking. Stacks 2 and 3 showed moderate caking as well as noticeable shrinkage and yellow discoloration. Stacks 4 and 5 showed relatively no caking, there was no noticeable shrinkage and the color remained white. Any slight caking formed on the surface of stacks 4 and 5 broke apart with the application of finger pressure to the stack surfaces.

EXAMPLE 9

Five grams of the 300 screen anticaking composition of Example 6 were added to a tumbler mixer containing 100 kg of commercially available fine table salt (NaCl). The table salt was blended for five minutes and then packed into 125 g salt shakers for testing. Those shakers were designated Sample A. The modified salt product flowed freely during the packaging. All of the salt shakers utilized in this test had openings which exposed the contained salt to the surrounding environment. The salt shakers were then held for one year under various conditions to test for color, appearance, taste and flowability. The shakers of Sample A were tested with three other samples for caking under humid conditions.

Samples B, C and D were prepared for comparison with Sample A as follows. Sample B consisted of 125 g salt shakers containing the same fine table salt but without any anticaking additive. Sample C consisted of 125 g salt shakers containing the same fine table salt but with an addition of 5 ppm of an aluminum silicon dioxide composition manufactured by J. R. Simplot Company, Boise, Id. Sample D consisted of 125 g salt shakers containing the same fine table salt but with an addition of 0.50% by weight the aluminum silicon dioxide composition.

Twenty-four shakers were taken from each group and immediately tested for caking using the industry standard method of exposure to extreme fluctuations of humidity for a period of 48 hours, followed by drying the salt to a water content of less than 0.1%. After 48 hours, the shakers from each group were analyzed for caking. The Sample B and C shakers showed severe caking, and the Sample C shakers showed moderate caking. The Sample A shakers showed no evidence of caking and had free flowability characteristics.

One hundred shakers from each group were then taken to a test station and exposed to coastal sea humidities ranging from 47% to 78% for a one year period of time. Occasionally during the one year period the shakers from each group were examined for caking, and only shakers from Samples A and D were functional in that the salt could flow from the shaker. Samples A and B retained water and would not decant salt during these field tests. At the conclusion of one year, the samples were dried to less than 0.1% moisture levels and examined for caking. Samples B and C were entirely caked after such exposure during one year, whereas Sample D showed moderate caking. The shakers of Sample A, containing the modified salt treated with the anticaking agent of the invention, showed no signs of caking after the one year exposure at such high humidity levels.

As indicated by the previous examples, the composition of each component in the anticaking agent of the invention may vary significantly without losing the effectiveness of the agent when treating a salt. The examples also indicate that a variety of methods may be utilized to apply the anticaking agent to a salt thereby forming a modified salt product, including mixing of the agent with the salt under both wet and dry conditions. In addition to treating the sodium chloride salts of the examples, the anticaking agent of the invention is also effective in treating other alkali chloride containing industrial salt mixtures, such as potassium chloride and various other fertilizer salts.

It should be appreciated that the embodiments in the examples described herein and relating to the manufacture of the anticaking agent of the invention as well as the modified salt product should be considered as illustrative only and should not be taken in a limiting sense. It is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. An anticaking agent comprising a complex including a substantially water insoluble protein, a water soluble saccharide, a salt comprising an alkali metal or an alkaline earth metal salt, and an acid; wherein each of the protein, saccharide, salt and acid is provided in a sufficient amount within the complex to render the agent effective in preventing agglomeration of a particulate material when added thereto, and wherein said salt in said complex includes calcium chloride and magnesium chloride and the weight ratio of calcium chloride to magnesium chloride is at least 3:1.

2. The agent of claim 1, wherein the protein is zein, the saccharide is guar gum, the salt includes sodium chloride and the acid is one of citric acid and citric acid combined with ascorbic acid.

3. The agent of claim 1, wherein the protein comprises a prolamine.

4. The agent of claim 3, wherein the prolamine is selected from the group consisting of zein, hordein, gliadin, millet and combinations thereof.

5. The agent of claim 4, wherein the prolamine is zein having a weight percentage within the complex in a range of about 0.000164–99.997%.

6. The agent of claim 1, wherein the saccharide is a polysaccharide selected from the group consisting of guar gum, pectin, gum Arabic and combinations thereof.

7. The agent of claim 6, wherein the saccharide is guar gum having a weight percentage within the complex in the range of about 0.001–99.87%.

8. The agent of claim 1, wherein the alkali metal or alkaline earth metal salt is selected from the group consisting of chlorides, carbonates, sulphates, silicates and combinatons thereof.

9. The agent of claim 8, wherein the salt includes sodium chloride having a weight percentage within the complex in the range of about 0.001–99.5%.

10. The agent of claim 1, wherein the acid is an organic acid having a weight percentage within the complex in the range of about 0.001–10%.

11. The agent of claim 10, wherein the organic acid is at least one of citric acid and ascorbic acid.

12. The agent of claim 1, wherein the protein is zein having a weight percentage in the range of about 0.001–99.997% within the complex, the saccharide is guar gum having a weight percentage in the range of about 0.001–99.87% within the complex, the salt is sodium chloride having a weight percentage in the range of about 0.001–99.5% within the complex and the acid is one of citric acid and citric acid combined with ascorbic acid, the acid having a weight percentage of about 0.001–10% within the complex.

13. The agent of claim 12, wherein the weight percentage of the zein is in a range of about 0.1–5%, the weight percentage of the guar gum is about 90–96%, the weight percentage of the sodium chloride is about 1–3% and the weight percentage of the acid is about 0.5–3%.

14. A complex including zein, guar gum, an alkali metal or alkaline earth metal salt, and an acid, and wherein said salt in said complex includes calcium chloride and magnesium chloride and the weight ratio of calcium chloride to magnesium chloride is at least 3:1.

15. The complex of claim 14, wherein the salt includes sodium chloride and the acid includes at least one of citric acid and ascorbic acid.

16. The complex of claim 15, wherein the zein is in the complex in an amount of about 0.1–5% by weight, the guar gum is in the complex in an amount of about 90–96% by weight, the sodium chloride is in the complex in an amount of about 1–3% by weight, and the acid is in the complex in an amount of about 0.5–3% by weight.

17. An anticaking agent comprising a complex including a substantially water insoluble protein in an amount of about 0.1–5% by weight of the complex, a water soluble saccharide in an amount of about 90–96% by weight of the complex, a salt comprising an alkali metal or an alkaline earth metal salt in an amount of about 1–3% by weight of the complex, and an acid in an amount of about 0.5–3% by weight of the complex, wherein the anticaking agent is effective in preventing agglomeration of a selected amount of a particulate material when added thereto, and wherein said salt in said complex includes calcium chloride and magnesium chloride and the weight ratio of calcium chloride to magnesium chloride is at least 3:1.

18. A modified salt product resistant to caking after exposure to moisture comprising an inorganic salt combined with a complex including a substantially water insoluble protein, a water soluble saccharide, a salt comprising an alkali metal salt or an alkaline earth metal salt, and an acid; wherein a majority of the modified salt product consists essentially of the inorganic salt.

19. The salt product of claim 18, wherein the inorganic salt comprises sodium chloride.

20. The salt product of claim 18, wherein the protein is a prolamine selected from the group consisting of zein, hordein, gliadin, millet and combinations thereof, the saccharide is a polysaccharide selected from the group consisting of guar gum, pectin, gum Arabic and combinations thereof, and the salt of the anticaking agent is selected from the group consisting of chlorides, carbonates, sulphates, silicates and combinations thereof.

21. The salt product of claim 20, wherein the protein is zein, the saccharide is guar gum, the salt of the complex includes sodium chloride and the acid is at least one of citric acid and ascorbic acid.

22. The salt product of claim 20, wherein the salt of the complex is sodium chloride mixed with calcium chloride and magnesium chloride.

23. The salt product of claim 22, wherein the weight ratio of calcium chloride to magnesium chloride in the complex is at least 3:1.

24. The salt product of claim 18, wherein an effective amount of complex is present in the salt product to prevent caking of the salt product.

25. The salt product of claim 24, wherein the effective amount of complex present in the salt product by weight is less than about 100 ppm.

26. The salt product of claim 25, wherein the effective amount of complex present in the salt product by weight is about 3–5 ppm.

* * * * *